United States Patent [19]

Piasecki

[11] Patent Number: 4,624,599
[45] Date of Patent: Nov. 25, 1986

[54] MULTI-TUBULAR TRUSS JOINT AND METHOD OF JOINING TUBE ENDS

[75] Inventor: Frank N. Piasecki, Haverford, Pa.

[73] Assignee: Piasecki Aircraft Corp., Essington, Pa.

[21] Appl. No.: 620,700

[22] Filed: Jun. 14, 1984

[51] Int. Cl.$^4$ .......................... F16D 3/00; B64C 1/06
[52] U.S. Cl. .................................... 403/178; 403/262; 403/382; 403/393; 403/403; 244/131
[58] Field of Search ............... 403/382, 403, 174, 178, 403/169, 217, 98, 4, 393, 262, 199, 231, 171, 176; 52/726, 657, 658, 693; 244/131, 117 R, 119, 37

[56] References Cited

U.S. PATENT DOCUMENTS

| | | | |
|---|---|---|---|
| 620,422 | 2/1899 | Crandall | 403/4 |
| 1,376,895 | 5/1921 | Murnane | 403/174 |
| 1,588,268 | 6/1926 | Roche | 403/171 |
| 1,773,357 | 8/1930 | Griswold | 244/131 |
| 2,912,075 | 11/1959 | Pfistershammer | 403/176 |
| 3,861,107 | 1/1975 | Papayoti | 403/171 |
| 4,094,116 | 6/1978 | Gilb | 403/217 |
| 4,219,285 | 8/1980 | Hayashi | 403/231 |
| 4,280,769 | 7/1981 | Ceglowski | 403/171 |
| 4,347,015 | 8/1982 | Olashaw | 403/171 |

FOREIGN PATENT DOCUMENTS

| | | | |
|---|---|---|---|
| 2242 | of 1897 | United Kingdom | 403/217 |
| 583622 | 12/1946 | United Kingdom | 403/98 |

Primary Examiner—Cornelius J. Husar
Assistant Examiner—Peter M. Cuomo
Attorney, Agent, or Firm—Willard M. Hanger

[57] ABSTRACT

A structural joint and method of making the joint wherein an end portion of each of a plurality of tubes is partially flattened into an elongated, oval annular shape of a cross sectional contour that the flattened ends of the tubes can be telescopically nested within one another, the tubes are arranged to have their axes coplanar to intersect at the joint node with the tube flattened ends in a telescopically, mutually nesting relationship to each other, a splice plate extending into the interior of the nested array of flattened tube ends and having upper and lower surfaces in an underlying, closely adjoining relation to interior surfaces of each of the tube flattened end portions, and fastening means tightly clamping together the nesting, flattened tube ends and splice plate contained therewithin.

24 Claims, 6 Drawing Figures

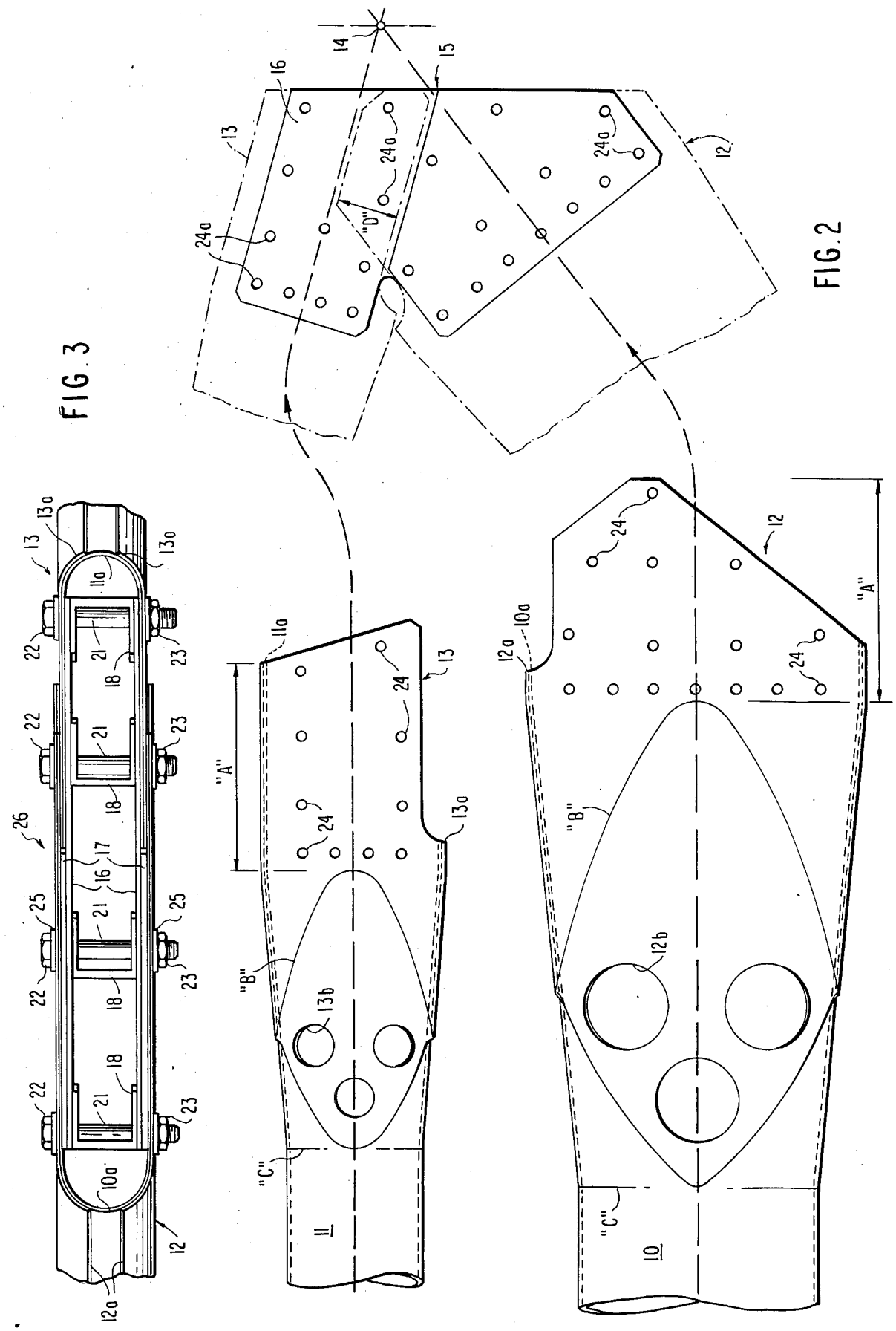

MULTI-TUBULAR TRUSS JOINT AND METHOD OF JOINING TUBE ENDS

BACKGROUND OF THE INVENTION

This invention relates to a mechanical structural joint and particularly one for connecting together the ends of long hollow tubes radiating outwardly from the intersecting points, or nodes, of a multiple tube truss network structure and a method of forming such a joint at the nodes of a truss structure.

Thin-wall hollow tubes are highly advantageous as structural members for creating a lightweight truss structure of large dimensions, particularly one intended for an airborne structure. In such a large truss structure the manner of connecting together the ends of angularly arranged tubes intersecting at the nodes of the truss structure creates a problem. It is normally not desirable to weld together the ends of tube members where they intersect at the truss nodes due to destroying the heat treat condition of the tubes, and other assembly problems. Therefore, some type of mechanical joint must be utilized. Many types of mechanical joints are possible and have been used, such as a central joining piece with arms projecting outwardly at the node in the various directions of the individual tubular members of the truss. However, each tubular member must be separately attached to the central piece, usually a solid forging, requiring a large number of fastenings and resulting in an excessively heavy structure which is expensive and complicated to fabricate. Commonly the ends of the tubes to be joined are completely flattened, the solid flattened ends overlapped and bolted together in the manner of U.S. Pat. No. 4,187,034, USSR Pat. No. 594,269 and European Pat. No. 0 023 721. Various fasteners and central joining pieces have been utilized to mechanically fasten together the ends of hollow tubes at a joint in the manner of U.S. Pat. Nos. 1,582,587, 2,912,075, 4,259,821, 4,322,176 and German Patentschrift No. 237,050.

SUMMARY OF THE INVENTION

The object of the invention is to provide a high strength joint for connecting the ends of hollow tubular members. Another object of the invention is to connect the ends of hollow tubes that intersect at the nodes of a truss structure formed from hollow tubes.

A further object of the invention is to provide a manner of joining together the ends of hollow tubular members without disturbing the heat treat condition of the tubular members.

Still a further object of the invention is to join together the ends of a number of hollow tubes arranged in an angular relationship to intersect at a point.

Yet another object of the invention is to join together at the nodes of a truss structure separate sets of co-planar groups of angularly arranged tubes intersecting at the nodes in an angular relationship to one another.

Still another object of the invention is to provide a simple and inexpensive means of connecting together the ends of angularly aligned, hollow tubular members into high strength mechanical joints in the construction of a large, three dimensional light truss network formed of hollow tubular members.

Yet still another object of the invention is to provide a means of joining together the ends of different diameter hollow tubes.

An additional object of the invention is to create a mechanical joint connecting the hollow tubular beams of a complex truss network in a manner to avoid localized stresses and provide an evenly distributed carry-over of loads between the tubular beams of the truss network.

The foregoing and other objects of the invention are achieved in a preferred embodiment of the invention by partially flattening the ends of each of the tubes to be joined into an elongated annular shape of such dimension that the ends of the tubes to be joined will telescopically fit together in a mutually nesting relationship, arranging the tubes to be joined such that the flattened end portions are in an overlapping, telescopically nesting relationship with a hollow splice plate of sandwich construction extending into the space within the interior of the nesting tube ends in engagement with interior surfaces of each of the flattened tube ends, and fastening together the nesting arrangement of the overlapping, flattened tube ends and splice plate by bolts extending transversely of the nesting arrangement through holes at spaced intervals in the flattened tube ends and splice plate.

Other objects and advantages of the invention will hereafter become more fully apparent from the following description and the annexed drawings which illustrate a preferred bodiment of the invention.

DRAWINGS

FIG. 2 is an exploded plan view of the joint of FIG. 1.

FIG. 3 is an end view of the joint of FIG. 1.

FIG. 1 is one component.

DETAILED DESCRIPTION

Figure 1:
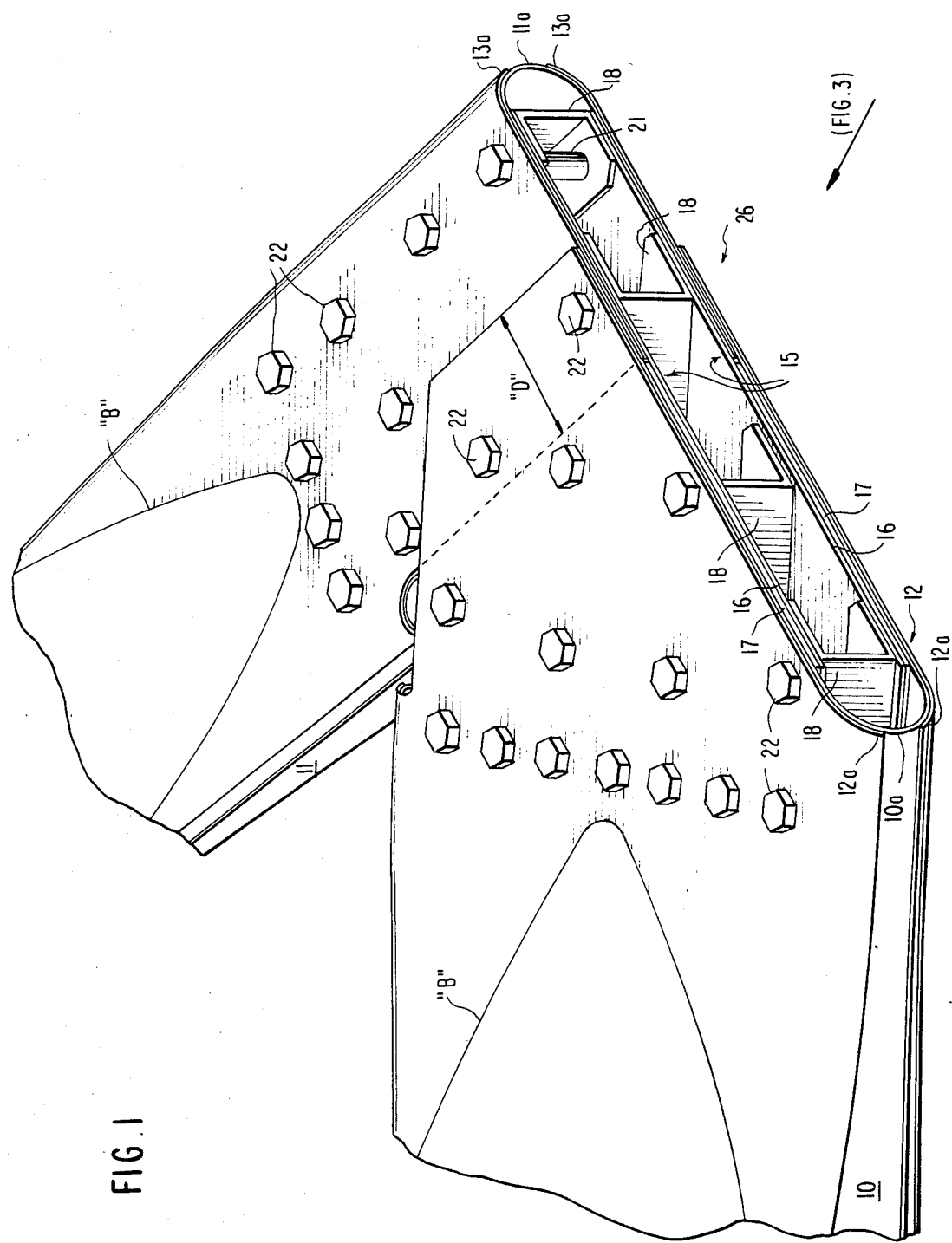
FIG. 1 is a perspective view of a two member tubular joint.
Figure 4:
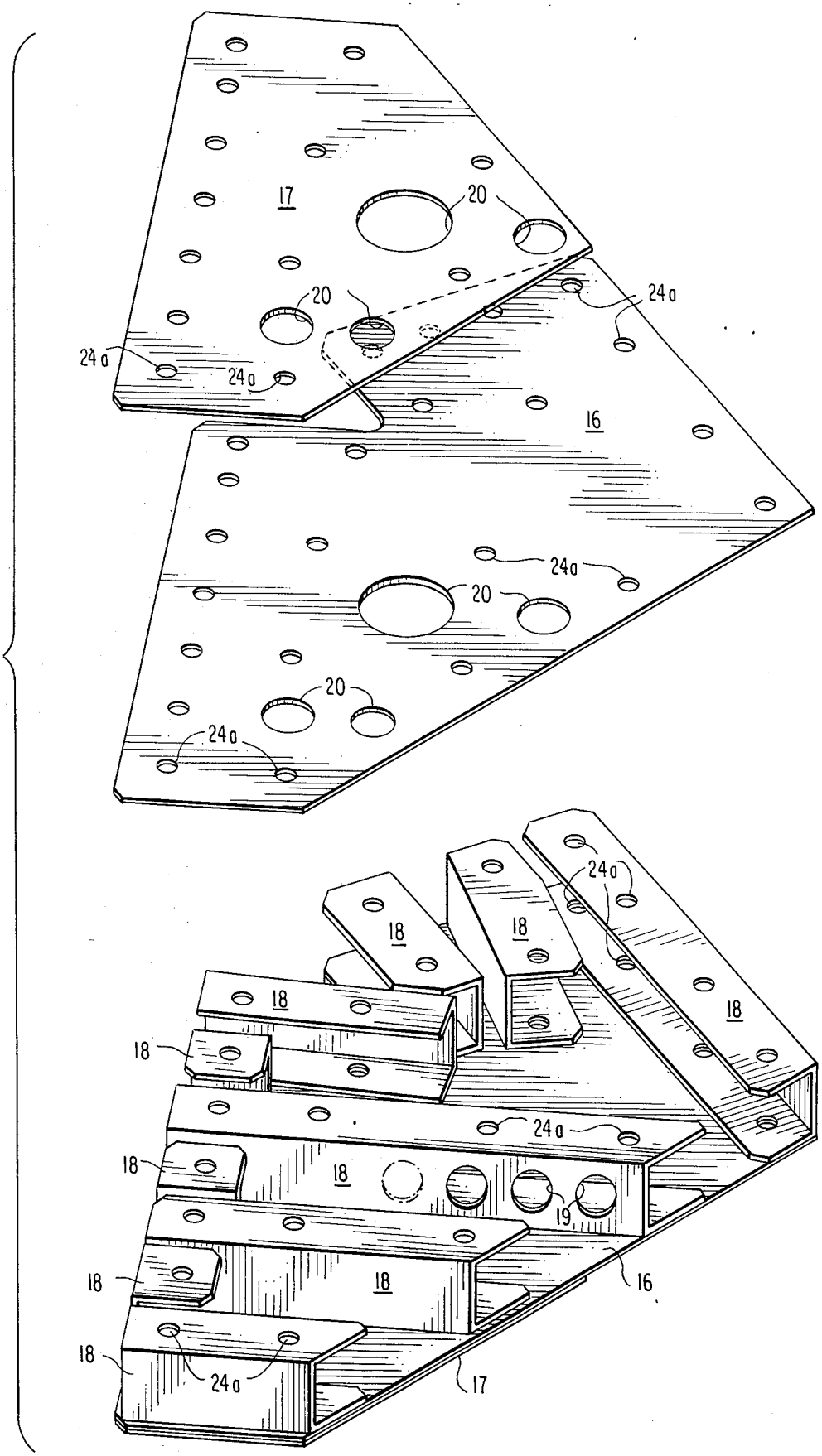
FIG. 4 is a partially exploded perspective view of the splice plate of the joint of FIGS. 1, 2, and 3.

The major components of a basic type, two member joint of FIGS. 1–3, in which one end of the larger diameter tube 10 is joined to the end of the smaller diameter tube 11 at a node 14 of a truss structure (not illustrated), are illustrated in the exploded plan view of FIG. 4. The ends 10a and 11a of the two hollow, round tubes 10, 11 may be conveniently flattened into an elongated and flat oval shape by placing each tube end between a pair of dies, each of which conforms to the half-contour shape of the flattened tube end, placing a crushable material (e.g. a foamed plastic) within the end portion of the tube and crushing the tube end between the two dies in the jaws of a press. The tube crushing dies gradually taper the cross sectional contour of each tube from the original circular cross sectional shape to an elongated, flattened oval shape a short distance "A" from the tube end as labeled and illustrated by the solid contour lines "B" and "C" on FIG. 2. The outer flattened ends of each tube over the dimension "A" have a uniform cross section so the tubes can be telescopically nested. A pair of doubler plates 12a, shaped to the contours of the upper and lower halves of the flattened end portion of 10a of tube 10, are secured to the outer surfaces of the upper and lower halves of the tube flattened end portion 10a by cement or rivets as desired in forming the end of tube 10 into a reinforced flattened end 12. Similarly, a pair of doubler plates 13a are secured to the outer surfaces of the upper and lower halves of the flattened end portion 11a of tube 11 forming the reinforced flattened end 13. Lightening holes 12b and 13b in the upper portions of the doubler plates 12a and 13a reduce weight. As apparent from FIGS. 1 and 3, the height dimensions of the respective reinforced flattened end portions 12 and 13 of tubes 10 and 11 are such that a portion of the flattened end 13 of tube 11 can be inserted within the flattened end 12 of tube 10 (as represented by the phantom lines in the right hand portion of FIG. 2) to place segments of the flattened end portions 12 and 13 of the respective tubes 10 and 11 (represented by the area beneath the dimension "D" of FIG. 2) into a telescopically nesting relationship in which interior surfaces along the top and bottom of flattened end portion 13 are in contact with and overlie outer surfaces of the top and bottom of flattened end portion 12 with the longitudinal axes of tubes 10 and 11 intersecting at the node 14 of a truss structure. Such a structure typically could be of the nature shown in FIG. 1 of U.S. Pat. No. 4,259,821, in which a large number of tubular members are arranged in an angular relationship with the ends of tubes intersecting at nodes to form a complex truss network. Portions of the flattened tube ends 12 and 13 are cut away into the contours illustrated in FIG. 2 so the flattened ends can telescopically fit together in the angular relationship represented by the phantom lines of the assembled tubes at the right portion of FIG. 2 in a manner to avoid interference between the tube flattened end portions 12 and 13 and also to provide clearance for being joined to a second joint of tubes at node 14 in creating a compound joint at the node as will be subsequently described in relation to FIGS. 5 and 6.

A composite, lightweight splice plate 15 fits into the interior of the endmost portions of the flattened end portions 12 and 13 of the tubes 10 and 11 with the upper and lower surfaces of the splice plate 15 in a closely adjoining relation to the overlying surfaces of the flattened end portions 12 and 13 of the tubes 10 and 11. The splice plate 15 comprises a pair of spaced apart upper and lower main plates 16, a portion of each of which are overlapped by a pair of upper and lower riser plates 17 with each set of overlapping main and riser plates being separated by channels 18 secured to the plates by an epoxy adhesive or other convenient manner, lightening holes 19 being spaced apart along the webs of the channels. Lightening holes 20 (only a few being illustrated) are also present in the main and riser plates to reduce weight. Since the interior height dimensions of the oval-shaped flattened end portions 12 and 13 of the tubes 10 and 11 vary to permit the respective tube ends to be telescopically nested one within the other with segments of the two tube ends overlapping, the thickness of different portions of the splice plate 15 immediately underlying each of the tube flattened end portions must differ which is accomplished by the composite construction utilizing riser plates 17 overlapping portions of the main plates 16, as is readily apparent from FIGS. 1 and 3. Bolts 21 having heads 22 and nuts 23 overlying washers 25, extending through holes 24 in the flattened end portions 12 and 13 of tubes 10 and 11 in registry with holes 24a in the upper and lower plates 16 and 17 and the channels 18 of the splice plate, tightly clamp together the nested tube flattened end portions 12 and 13 and the underlying splice plate 15 to form the rigid intergral joint 26 connecting the ends of the angularly arranged tubes 10 and 11 at the node 14. Although the described arrangement of overlapping riser and main plates separated by elongated channels provides a convenient lightweight splice plate of variable thickness serving as an anvil around which the respective tube wall ends are tightly clamped by the bolts 21 into a rigid joint, equivalent construction could be utilized in producing a variable thickness splice plate of the same external contours such as utilizing multiple short lengths of tubing in lieu of channels as separaters between the upper and lower plates of the splice plate. Other equivalent forms of a lightweight splice plate around which the telescopically nesting flattened tube ends may be tightly clamped would be readily apparent to those normally skilled in the art.

The two member joint 26 described above with reference to FIGS. 1–4 represents a simple basic joint of the invention connecting the ends of two co-planar tubes. However, the same basic construction of the two member joint can be utilized in connecting ends of three or more co-planar tubular members intersecting at a node. As in the two member joint 26 described above, an end of each of the tubes to be joined is flattened to an elongated annular shape in the manner described for the two member joint with the dimensions of each of the flattened tube ends varying to the degree that the respective tube ends of the multiple tubes are arrangable into a telescopic, mutually nesting relationship. A multi-layered splice plate fits into the interior of the telescopically nested flattened tube ends in an immediately adjoining relationship with the interior surfaces of each flattened tube end and, in a preferred embodiment, comprises a pair of sets of plates in which the number of plates in each set is equal to the number of tubes in the joint with the plates comprising each set of the pair arranged in an overlapping manner and the two sets of plates are separated by elongated channels in the same general manner as FIG. 4.

Figure 6:
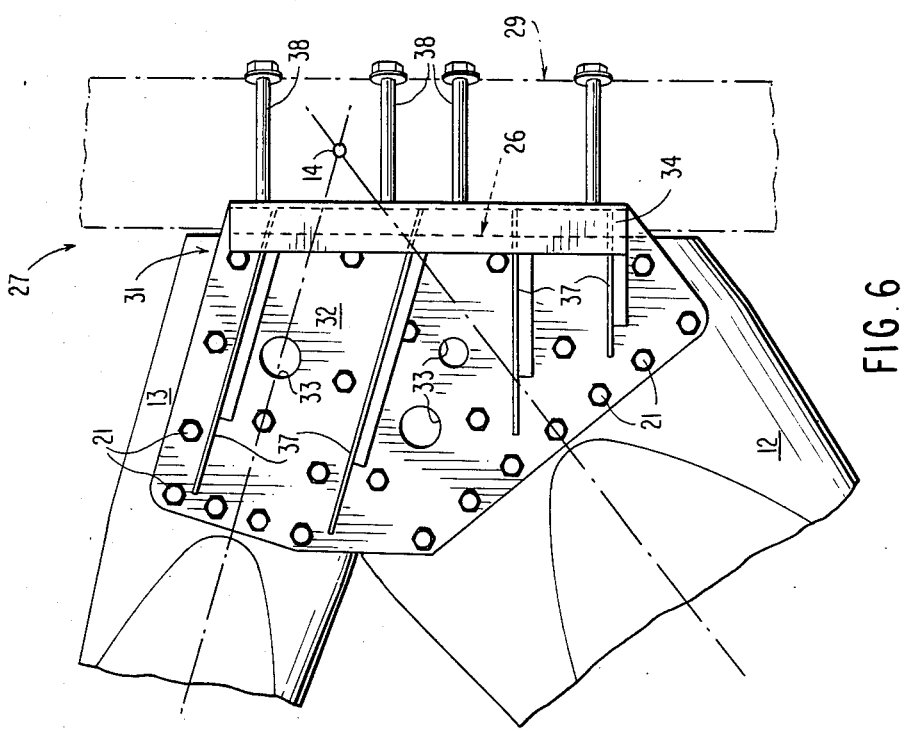
FIG. 6 is a plan view of the compound joint of FIG. 1.
Figure 5:
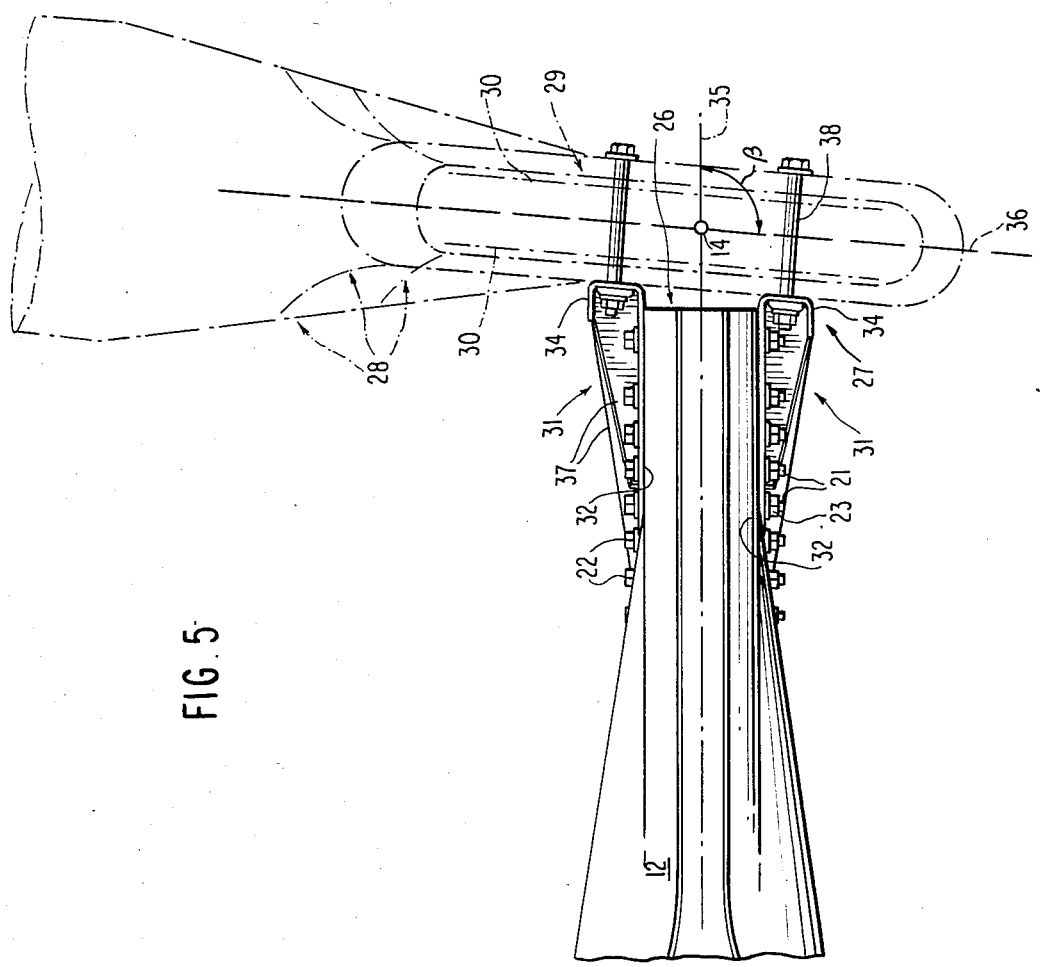
FIG. 5 is a side view of a compound joint of which the two-member

FIGS. 5 and 6 illustrate a compound joint 27 at node 14 comprising the intersection of a first set of co-planar tubes, such as tubes 10 and 11 connected by the joint 26 illustrated in FIG. 1, and a second set of co-planar tubes 28 schematically illustrated by phantom lines in FIG. 5, in which the flattened ends of each of the tubes 28 are connected by the joint 29 of which the splice plate 30 is an integral portion (schematically illustrated by phantom lines in FIGS. 5 and 6). The phantom lines in FIGS. 5 and 6 represent a set of co-planar tubes angularly arranged in the common plane 36 with their telescopically nesting flattened ends overlying a splice plate to form a connecting joint 29 basically equivalent to the one described with respect to FIG. 1. Upper and lower brackets 31 are rigidly connected to members comprising each of the joints 26 and 29 that respectively join the ends of each of the two sets of co-planar tubes 10, 11 and 28 intersecting at node 14. As best seen in FIGS. 5 and 6, each bracket 31 includes a faceplate 32 contoured to overlie the flattened end portions 12 and 13 of joint 26 and at the end of the face plate adjacent the node 14 and end plate 34 extends upwardly at the angle subtended between plane 35 of co-planar tubes 10 and 11 and plane 36 of the co-planar set of tubes 28. Several upstanding L-shaped gussets 37 extending across each faceplate 32 are welded to the face plate and end plate 34 of the brackets 31. Bolts 21 extending through and joining together the flattened tube ends and the splice plate of joint 26 and bolts 38 which extend through the flattened end portions of the second set of tubes 28 and splice plate 30 in forming the second tube joint 29, rigidly connect the members comprising each of the two tubular joints 26 and 29 to the upper and lower brackets 31 to form the compound joint 27 at the node 14. Lightening holes 33 of the general nature illustrated in FIG. 6 may be incorporated in various components of the brackets 31. Obviously brackets having more than the two angularly arranged plates 32 and 34 of bracket 31 that connect the respective joints of the two sets of tubes as illustrated in FIGS. 5 and 6 can be formed to connect the joints of each of three or more co-planar tube sets intersecting at a common node.

The configurations of the joints illustrated and described in FIGS. 1-6 have been chosen as sample of the simle embodiments of the invention to promote an easy understanding. Although round tubes are utilized as the members of most truss structures, trusses utilizing hollow tubes of other than a circular cross section could be joined by this invention in the same manner as the illustrated hollow tubes by deforming the ends of the tubes to be joined into elongated contours which can be telescopically nested together with their inner surfaces in overlapping contact with a splice plate fitting within the deformed tube ends. In utilizing this invention in joining hollow tubes of any cross-sectional shape, round or otherwise, the ends of the tubes to be joined need not be deformed into the elongated oval shape described with respect to FIGS. 1-6 but can be deformed into any shape whereby the tube ends can be telescopically arranged in a nesting relationship, e.g. the contour of the flattened tube ends could be rectangular.

Various modifications of the invention are contemplated and may obviously be resorted to by those skilled in the art without departing from the spirit and scope of the invention as hereinafter defined by the amended claims.

What is claimed is:

1. A structural joint comprising a plurality of partially flattened end portions of hollow cylindrical tubes, said tubes being arranged in an angular relationship with segments of each of said flattened end portions in a telescopically nesting relationship with the axes of the tubes intersecting, at the joint a segmental splice plate having an upper surface and a lower surface of which corresponding segments in different portions of said splice plate are separated by different distances, said splice plate extending interiorly of each said tube flattened end portion with said splice plate upper and lower surface segments respectively in overlapping contact with upper and lower interior surfaces of each of said plurality of tube flattened end portions, and a plurality of spaced apart, fixed fastening means in clamping contact with opposite exterior surfaces of and penetrating transversely of each said tube flattened end portion and said contacting splice plate contained therewithin for permanently clamping together said plurality of tube flattened end portions and said splice plate into an integral structural joint.

2. The joint of claim 1 wherein the cross-sectional contour of each said tube flattened end portion tapers from a uniform cross-sectional contour of the tube central portion to an elongated, annular cross-sectional contour having a width dimension substantially greater than the height dimension and said height dimension of each of said flattened end portions varies from each other to the degree that segments of said plurality of flattened tube end portions are telescopically arrangeable into a nesting relationship.

3. The joint of claim 2 wherein each of said plurality of tube flattened end portions overlying said splice plate has flat and parallel upper and lower walls of which the opposite interior surfaces of each of said walls are in overlapping contact with said splice plate upper and lower surfaces.

4. The joint of claim 3 wherein said splice plate is of sandwich construction with spaced apart upper and lower wall plates separated by web means.

5. The joint of claim 4 wherein each of said splice plate upper and lower wall plates comprises a plurality of flat plates each having a portion overlying a portion of each of the other of said plurality of flat plates.

6. The joint of claim 5 wherein each said fastening means comprises bolt means extending transversely through said tube flattened end portions and splice plate contained therewithin for clamping said end portions and splice plate together.

7. The joint of claim 6 wherein said web means includes a plurality of elongated channels of which the axes of a portion are aligned in the direction of the axis of the tube of an overlying flattened end portion.

8. The joint of claim 4 wherein a doubler plate overlies and is bonded to exterior surfaces of the upper and lower portions of each said tube flattened end portion.

9. The joint of claim 3 wherein the cross-sectional contour of each said tube flattened end portion overlying said splice plate is an elongated oval shape.

10. The joint of claim 9 wherein the central cross-sectional dimension of one of said plurality of tubes is substantially different than another of said plurality.

11. A multiple tubular structure comprising a plurality of elongated hollow tubes each having a partially flattened end portion with an elongated annular cross-sectional contour shape wider than the contour of the central portion of the tube, the height dimension of the crosssectional contour of each said tube flattened end portion being substantially less than the width dimension, said end portion height dimensions of said plurality of tubes varying from each other to the degree that segments of said flattened end portions of each of said plurality of tubes can be telescopically fitted into a mutually nesting relationship, said plurality of tubes being arranged into an array of mutually nesting flattened tube end portions in which segments of each said flattened end portion of each of said plurality of tubes are in a telescopically nesting relationship, a splice plate having an upper surface and a lower surface of which corresponding segments in different portions of said plate are separated by different distances, said splice plate extending interiorly of said array of telescopically nested flattened tube end portions with said splice plate upper and lower surface segments, respectively, in overlapping contact with upper and lower interior surfaces of the flattened end portions of each of said plurality of tubes, and a plurality of fixed fastening means at spaced intervals in contact with opposite exterior surfaces of each said tube flattened end portion of said array and penetrating through each said tube flattened end portion of said array and said splice plate contained therewithin for permanently clamping together said splice plate and said array of nesting, flattened tube end portions into an integral mechanical joint.

12. The tube structure of claim 11 wherein each said tube flattened end portion overlying said splice plate is an elongated annulus having flat and spaced apart, parallel upper and lower walls of which opposite interior surfaces of each of said walls are in overlapping contact with one of said splice plate surface segments.

13. The tube structure of claim 12 wherein said splice plate is of sandwich construction having spaced apart upper and lower wall plates separatd by web means.

14. The tubular structure of claim 13 wherein each said splice plate upper and lower wall plates comprises a plurality of plates of which portions of each are in a mutually overlapping relationship, whereby the thickness dimension of different portions of said splice plate varies.

15. The tubular structure of claim 13 wherein said web means comprises elongated channels having upper and lower flanges fixed, respectively, to said splice plate upper and lower wall plates.

16. The tubular structure of claim 14 wherein said web means comprises elongated channels having upper and lower flanges fixed, respectively, to said splice plate upper and lower wall plates.

17. The tubular structure of claim 14 wherein each said tube flattened end portion includes a doubler plate overlying and bonded upper and lower surfaces of said tube flattened end portion.

18. The tubular structure of claim 13 wherein the cross-sectional dimension of the central portion of one of said plurality of tubes is substantially different than another of said plurality of tubes.

19. A tubular structural joint for a multiple tube structure having a first plurality of hollow tubes arranged in angular relationship to one another in one plane with the longitudinal axes of said first plurality of tubes intersecting at a node of said multiple tube structure and a second plurality of hollow tubes arranged in an angular relationship to one another in a second plane with the longitudinal axis of said second plurality of tubes intersecting at said node, said joint comprising end portions of each of said first plurality of tubes flattened into an elongated annular contour and angularly arranged with segments of the tube flattened ends of each of said first plurality of tubes mutually overlying in a telescopically nesting relationship, a first variable thickness splice plate having upper and lower surfaces of which corresponding segments in different portions of said plate have different separations, said splice plate extending interiorly of the flattened ends of each of said first plurality of tubes with segments of opposite surfaces of said splice plate in overlapping contact with interior surfaces of the tube flattened ends of each of said first plurality of tubes, end portions of each of said second plurality of tubes flattened into an elongated annular contour and angularly arranged with segments of the tube flattened end of each of said second plurality of tubes mutually overlying in a telescopically nesting relationship, a second variable thickness splice plate having upper and lower surfaces of which corresponding segments in different portions of said second plate have different separations, said second splice plate extending interiorly of the flattened end of each of said second plurality of tubes with segments of opposite surfaces of said second splice plate in overlapping contact with interior surfaces of the tube flattened ends of each of said second plurality of tubes, an upper bracket having a first section in an overlying contacting relation to an upper surface of each tube flattened end portion of said first plurality of tubes and a second section in an overlying contacting relation to one surface of each tube portion flattened end portion of said second plurality of tubes, a lower bracket having a first section in an overlying contacting relation to a lower surface of each tube flattened end portion of said first plurality of tubes and a second section in an overlying, contacting relation to said one surface of each tube flattened end portion of said second plurality of tubes, and a plurality of spaced apart fastening means in fixed clamping contact with the exterior surfaces of each one of said first and second sections of each said upper and lower bracket, said fastening means transversely penetrating said brackets and said flattened end portions of said first and second plurality of tubes and said splice plates contained therewithin.

20. A method of joining together the ends of a plurality of elongated tubes comprising the steps of compressing diametrically opposite walls of an end portion of each said tube sufficiently to flatten the shape of an endmost segment of each said end portion into an elongated, oval annulus having a width dimension greater than the central portion of the tube and a height dimension substantially less than said width dimension, said height dimension of the end of each tube end portion varying from each other as will permit segments of each said flattened end portion of each of said plurality to tubes to be telescopically fitted into a mutually nesting relationship, arranging said hollow tubes into an array in which the tube longitudinal axes are coplanar and intersect at a common point with said segments of the flattened end portions of each of said plurality of tubes in a mutually telescopically nesting relationship, inserting a segmental splice plate of which each segment has upper and lower surfaces separated by said different height dimension of each of said tube end portions into the interior of said array of tube end portions with the upper and lower surfaces of each of said splice plate segment in overlapping contact with an interior surface of each said tube flattened end portion of said plurality of tubes, and inserting fastening means to pass transversely of each said tube flattened end portion and splice plate contained therewith with opposite ends of each fastening means in fixed clamping contact with opposite sides of each said tube flattened end portion.

21. The method of claim 20 wherein each said tube flattened endmost segment is pressed into the shape of an elongated, oval annulus of which the central major portion comprises spaced apart, flat, parallel walls.

22. The method of claim 21 wherein said splice plate has flat, spaced apart, upper and lower walls separated by web means.

23. A structural joint comprising end portions of a plurality of hollow cylindrical tubes partially flattened into an elongated annular shape, said tube flattened end portions each having upper and lower interior facing surfaces, said upper and lower interior surfaces of each said flattened end portion separated by different distances, said plurality of tube flattened end portions being angularly arranged such that fractional portions of each of said tube flattened portions are in a mutually telescopically nesting and contacting relationship with the longitudinal axes of said plurality of tubes intersecting at the joint, a variable thickness splice plate having upper and lower exterior surfaces of which corresponding segments in different portions of said plate are separated by different distances, said splice plate being positioned interiorly of said plurality of angularly arranged flattened tube end portions with all portions of said splice plate upper and lower exterior surfaces in overlapping contact with upper and lower interior facing surfaces of each said tube telescopically nesting fractional end portion and major portions of the remainder of said tube flattened end portion upper and lower facing surfaces other than said telescopically nesting fractional tube flattened end portions, and a plurality of fastening means in contact with exterior surfaces of and transversely penetrating each said telescopically nesting fractional tube flattened end portion and each of said remainder of tube flattened end portions other than said telescopically nesting fractional tube flattened end portions and said splice plate contained with said plurality of tube flattened end portions.

24. The structural joint of claim 23 wherein said splice plate is of sandwich construction with spaced apart upper and lower wall plates separated by web means, said splice plate upper and lower wall plates each comprising a plurality of flat plates each having a portion overlying a portion of each of the other of said plurality of flat plates, and said web means comprises elongated channels having upper and lower flanges fixed respectively to said splice plate upper and lower wall plates.

* * * * *